United States Patent
Ito et al.

(10) Patent No.: US 12,441,823 B2
(45) Date of Patent: Oct. 14, 2025

(54) RESIN COMPOSITION FOR OPTICAL SHAPING

(71) Applicant: KURARAY NORITAKE DENTAL INC., Kurashiki (JP)

(72) Inventors: Misaki Ito, Niigata (JP); Kenji Suzuki, Niigata (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 855 days.

(21) Appl. No.: 17/416,216

(22) PCT Filed: Dec. 9, 2019

(86) PCT No.: PCT/JP2019/048149
§ 371 (c)(1),
(2) Date: Jun. 18, 2021

(87) PCT Pub. No.: WO2020/129736
PCT Pub. Date: Jun. 25, 2020

(65) Prior Publication Data
US 2022/0041777 A1 Feb. 10, 2022

(30) Foreign Application Priority Data
Dec. 21, 2018 (JP) .................. 2018-239380

(51) Int. Cl.
| | | |
|---|---|---|
| C08F 220/56 | (2006.01) | |
| A61K 6/887 | (2020.01) | |
| B29C 64/135 | (2017.01) | |
| B29C 64/314 | (2017.01) | |
| B33Y 10/00 | (2015.01) | |
| B33Y 70/00 | (2020.01) | |
| C08F 2/48 | (2006.01) | |
| C08F 220/18 | (2006.01) | |

(52) U.S. Cl.
CPC ............ *C08F 220/56* (2013.01); *A61K 6/887* (2020.01); *B29C 64/135* (2017.08); *B29C 64/314* (2017.08); *B33Y 10/00* (2014.12); *B33Y 70/00* (2014.12); *C08F 2/48* (2013.01); *C08F 220/18* (2013.01)

(58) Field of Classification Search
CPC ....................................................... C08F 220/56
See application file for complete search history.

(56) References Cited

U.S. PATENT DOCUMENTS

| | | | |
|---|---|---|---|
| 2016/0317260 A1* | 11/2016 | Schnitzspan | A61C 13/082 |
| 2017/0260405 A1* | 9/2017 | Kumai | C09D 11/102 |
| 2021/0024682 A1* | 1/2021 | Suzuki | C08G 18/6208 |

FOREIGN PATENT DOCUMENTS

| | | | | |
|---|---|---|---|---|
| EP | 2186625 B1 | * | 12/2016 | ......... B29C 67/007 |
| EP | 3 604 353 A1 | | 2/2020 | |
| JP | 56-144478 A | | 11/1981 | |
| JP | 60-247515 A | | 12/1985 | |
| JP | 61-143310 A | | 7/1986 | |
| JP | 2000-159621 A | | 6/2000 | |
| JP | 2010-155926 A | | 7/2010 | |
| JP | 5858128 B1 | * | 2/2016 | |
| JP | 2016-98324 A | | 5/2016 | |
| JP | 2016-172796 A | | 9/2016 | |
| JP | 2018154717 A | * | 10/2018 | |
| JP | 6543974 B2 | * | 7/2019 | |
| WO | WO-2018160660 A1 | * | 9/2018 | ......... A61B 5/0826 |
| WO | WO 2018/181832 A1 | | 10/2018 | |
| WO | WO 2019/189566 A1 | | 10/2019 | |

OTHER PUBLICATIONS

Machine translation of JP 2016172796 A, retrieved Feb. 2024 (Year: 2024).*
"2-propenoic acid,2-methyl-, 1,1'-[(1-methylethylidene)bis(4,1-phenyleneoxy-2,1-ethanediyl)]ester", LookChem.com, https://www.lookchem.com/2-Propenoic-acid-2-methyl--1-1---1-methylethylidene-bis-4-1-phenyleneoxy-2-1-ethanediyl-ester/, retrieved Feb. 2024 (Year: 2024).*
Machine translation of JP 6543974 B2, retrieved May 2024 (Year: 2024).*
Benmessaoud, N.; Hamri, S.; Bouchaor, T.; Maschke, U. Polym. Bull. 2020, 77, 5567 (Year: 2020).*

(Continued)

*Primary Examiner* — Michael F Pepitone
(74) *Attorney, Agent, or Firm* — Oblon, McClelland, Maier &Neustadt, L.L.P.

(57) ABSTRACT

A resin composition for optical shaping comprising: an α,β-unsaturated double bond group-containing compound (A) having a ring structure (a) containing a nitrogen atom; a (meth)acrylic acid ester compound (B) having a boiling point of 280° C. or more at normal pressure, having a carbocyclic group, and having no nitrogen-containing heterocyclic group; a photopolymerization initiator (C); and optionally, a polyfunctional polymerizable monomer (E) having a molecular weight of 500 or less and not comprised in the α,β-unsaturated double bond group-containing compound (A) and the (meth)acrylic acid ester compound (B), wherein the content of the polyfunctional polymerizable monomer (E) having a molecular weight of 500 or less is 20 mass % or less relative to the total amount of polymerizable compounds comprised in the resin composition for optical shaping.

18 Claims, No Drawings

(56) References Cited

OTHER PUBLICATIONS

English machine translation of Yamamoto (JP 2018-154717). (Year: 2018).*
ChemicalBook 2-Phenoxyethyl Acrylate (Year: 2017).*
Extended European Search Report issued Jul. 15, 2022 in European Patent Application No. 19898548.3, 7 pages.
International Search Report issued on Mar. 10, 2020 in PCT/JP2019/048149 filed on Dec. 9, 2019, 2 pages.

* cited by examiner

RESIN COMPOSITION FOR OPTICAL SHAPING

TECHNICAL FIELD

The present invention relates to a resin composition for optical shaping. Specifically, the present invention relates to a resin composition that emits a weaker odor, enables easy fabrication of an object by virtue of its low viscosity, and can be made into a three-dimensional product having desirable toughness and water resistance when used for stereolithographic fabrication (particularly by vat stereolithography). A resin composition of the present invention is particularly suited for dental occlusal splints, denture base materials, and appliances for treatment of sleep apnea.

BACKGROUND ART

Patent Literature 1 discloses a stereolithography technique, a method for producing a three-dimensional object through repeated irradiation of a liquid photocurable resin with a necessary amount of controlled light energy to cure the resin layer-by-layer as it is supplied onto the previously cured layer. Patent Literature 2 proposes a basic method for practical application of this technique, and, since its proposal, many other stereolithography techniques have been proposed.

Vat stereolithography is a technique commonly used for optical fabrication of a three-dimensional object. In this technique, the surface of a liquid photocurable resin composition placed in a vat is selectively irradiated with a computer-controlled ultraviolet laser to draw a desired pattern and form a cured layer having a predetermined thickness. Another cured layer is continuously formed on the cured layer by ultraviolet laser irradiation of the liquid photocurable resin composition supplied onto the previously cured layer in an amount necessary to form a single layer. The layering process is repeated to produce a three-dimensional object of the desired shape. This technique has attracted great interest because it enables easy and precision production of a desired three-dimensional object in a relatively short time period, even when the product has a very complex shape.

Three-dimensional objects produced by stereolithography are used in an increasingly wider range of applications, from simple concept models to more complex models such as test models and prototypes. This has created a demand for higher shape precision in these three-dimensional objects. In addition to satisfying such properties, these products are also required to have properties that are suited for their intended use. In particular, the field of dental materials is thought to benefit from stereolithography because dental occlusal splints and denture bases require shapes that vary from patient to patient, aside from being complex in shape.

Dental occlusal splints include dental aligners attached to teeth for the correction of teeth alignment, oral appliances (OAs) worn during sleep for treatment of sleep apnea, mouth guards attached to the oral cavity to lessen an external injury caused by application of a large external force to the teeth and the jaw bone and protect the stomatognathic system and the brain in contact sport games. In orthodontics, the use of dental occlusal splints has gained wide popularity over the last years because of aesthetics and detachability. Dental occlusal splints are also increasingly being used as appliances for treatment of sleep apnea, which is a disorder attracting medical interest.

Denture base materials are materials used for the gum as a part of a denture attached to replace missing teeth. The demand for dentures has rapidly increased in recent years because of increasing ageing populations.

Common requirements for dental occlusal splints and denture base materials include toughness and water resistance. A loss of toughness leads to discomfort, or causes the impact of external forces and biting forces to directly transmit to the jaw bone. Being prone to fractures is also problematic because it necessitates frequent replacement. A loss of water resistance makes these appliances practically useless as it causes reduction of mechanical strength, inability to deliver orthodontic forces or absorb shock, and weak fracture resistance.

Another consideration is that fabrication of dental occlusal splints, denture base materials, and appliances for treatment of sleep apnea typically requires taking an impression of the oral cavity. However, it has been pointed out that the procedure brings discomfort for patients and is a burden for them and that the procedure requires high technical skills. Recent advances in digital technology has led to approaches that make use of an intraoral optical scan for taking an oral impression, and there have been attempts to apply stereolithography techniques to shaping. For fabrication, photocurable resin compositions are used. Resin compositions that develop flexibility and water resistance commonly contains monomers having low polarity and thus have low curability, which tends to result in poor mechanical strength of cured products of such resin compositions. Especially in stereolithography, the light irradiation time is extremely short, and every layer of resin compositions is exposed to oxygen. These often lead to defects, notably insufficient curing. Indeed, it has been difficult to satisfy mechanical strength, toughness, and water resistance at the same time. Resin compositions are also required to have adequate viscosity for fabrication. However, many of monomers that develop mechanical strength have high viscosity. Use of low-viscosity monomers, which commonly have low boiling points, to achieve low-viscosity resin compositions creates an odor problem.

Against this background, various techniques are proposed that are intended to enable stereolithographic fabrication of a cured product having desirable mechanical strength with superior fabrication accuracy. For example, Patent Literature 3 proposes an active energy ray-polymerizable resin composition for stereolithography including: an α,β-unsaturated double bond group-containing compound having a ring structure containing a nitrogen atom; an α,β-unsaturated double bond group-containing compound having a ring structure containing no heteroatom; and an α,β-unsaturated double bond group-containing compound having no ring structure.

CITATION LIST

Patent Literature

Patent Literature 1: JP S56(1981)-144478 A
Patent Literature 2: JP S60(1985)-247515 A
Patent Literature 3: JP 2016-098324 A

SUMMARY OF INVENTION

Technical Problem

Patent Literature 3 does not specifically describe improvement in toughness and water resistance of the photocurable resin composition, and has a problem in that a monomer with a strong odor is used.

It is accordingly an object of the present invention to provide a resin composition for optical shaping that emits a weaker odor, enables easy fabrication of an object by virtue of its low viscosity, can be made into a cured product having desirable toughness and water resistance when used for stereolithographical fabrication (particularly by vat stereolithography). Another object of the present invention is to provide a resin composition for optical shaping particularly suited for dental occlusal splints and denture base materials.

Solution to Problem

Specifically, the present invention includes the following aspects.

[1] A resin composition for optical shaping comprising:
an α,β-unsaturated double bond group-containing compound (A) having a ring structure (a) containing a nitrogen atom;
a (meth)acrylic acid ester compound (B) having a boiling point of 280° C. or more at normal pressure, having a carbocyclic group, and having no nitrogen-containing heterocyclic group;
a photopolymerization initiator (C); and
optionally, a polyfunctional polymerizable monomer (E) having a molecular weight of 500 or less and not comprised in the α,β-unsaturated double bond group-containing compound (A) and the (meth)acrylic acid ester compound (B), wherein
the content of the polyfunctional polymerizable monomer (E) having a molecular weight of 500 or less is 20 mass % or less relative to the total amount of polymerizable compounds comprised in the resin composition for optical shaping.

[2] The resin composition for optical shaping according to [1], further comprising a urethanized (meth)acrylic compound (D).

[3] The resin composition for optical shaping according to [1] or [2], wherein the α,β-unsaturated double bond group-containing compound (A) has the ring structure (a) containing neither an oxygen atom nor a sulfur atom.

[4] The resin composition for optical shaping according to any one of [1] to [3], wherein the α,β-unsaturated double bond group-containing compound (A) comprises an N-vinyl group-containing compound (A)-1 having the ring structure (a).

[5] The resin composition for optical shaping according to any one of [1] to [4], wherein the α,β-unsaturated double bond group-containing compound (A) comprises a (meth) acrylic acid ester (A)-2 having the ring structure (a) and/or a (meth)acrylamide (A)-3 having the ring structure (a).

[6] The resin composition for optical shaping according to any one of [1] to [5], wherein the ring structure (a) containing a nitrogen atom is a piperidine ring.

[7] The resin composition for optical shaping according to any one of [1] to [6], wherein the α, β-unsaturated double bond group-containing compound (A) is monofunctional.

[8] The resin composition for optical shaping according to [4], wherein the N-vinyl group-containing compound (A)-1 is at least one selected from the group consisting of N-vinylcarbazole, N-vinyl-ε-caprolactam, and N-vinyl-2-pyrrolidone.

[9] The resin composition for optical shaping according to any one of [1] to [8], wherein the (meth)acrylic acid ester compound (B) comprises a monofunctional (meth)acrylic acid ester compound.

[10] The resin composition for optical shaping according to any one of [1] to [9], not comprising the polyfunctional polymerizable monomer (E) having a molecular weight of 500 or less.

[11] The resin composition for optical shaping according to any one of [1] to [10], wherein the (meth)acrylic acid ester compound (B) comprises a monofunctional (meth)acrylic acid ester compound (B)-1 whose homopolymer has a glass transition temperature of 40° C. or less.

[12] The resin composition for optical shaping according to any one of [1] to [11], further comprising a urethanized (meth)acrylic compound (D), wherein
the urethanized (meth)acrylic compound (D) is a (meth) acrylate having, per molecule, a urethane bond and at least one structure selected from the group consisting of a polyester, a polycarbonate, a polyurethane, a polyether, a poly(conjugated diene), and a hydrogenated poly(conjugated diene).

[13] A dental material comprising a cured product of the resin composition for optical shaping according to any one of [1] to [12].

[14] A dental occlusal splint comprising a cured product of the resin composition for optical shaping according to any one of [1] to [12].

[15] A denture base material comprising a cured product of the resin composition for optical shaping according to any one of [1] to [12].

[16] A medical material comprising a cured product of the resin composition for optical shaping according to any one of [1] to [12].

[17] An appliance for treatment of sleep apnea comprising a cured product of the resin composition for optical shaping according to any one of [1] to [12].

[18] A method for stereolithographically producing a three-dimensional object using the resin composition for optical shaping according to any one of [1] to [12].

Advantageous Effects of Invention

A resin composition for optical shaping of the present invention emits a weaker odor, enables easy fabrication of an object by virtue of its low viscosity, and can be made into a cured product having desirable toughness and water resistance when used for stereolithographic fabrication (particularly by vat stereolithography), and therefore can be suitably used for a variety of dental materials, particularly dental occlusal splints (mouthpieces) and denture base materials, or a variety of medical materials, particularly appliances for treatment of sleep apnea.

DESCRIPTION OF EMBODIMENTS

A resin composition for optical shaping of the present invention comprises: an α,β-unsaturated double bond group-containing compound (A) having a ring structure (a) containing a nitrogen atom; a (meth)acrylic acid ester compound (B) having a boiling point of 280° C. or more at normal pressure and having no ring structure containing a heteroatom; a photopolymerization initiator (C); and optionally, a polyfunctional polymerizable monomer (E) having a molecular weight of 500 or less and not comprised in the α,β-unsaturated double bond group-containing compound (A) and the (meth)acrylic acid ester compound (B), wherein the content of the polyfunctional polymerizable monomer (E) having a molecular weight of 500 or less is 20 mass % or less relative to the total amount of polymerizable compounds comprised in the resin composition for optical shaping. In the present specification, the upper limits and lower limits of numeric ranges (for example, ranges of contents of components, ranges of values calculated from components, and numeric ranges of physical properties) can be combined appropriately. In the present specification, the numeric values represented by symbols in various formulae also can be combined appropriately. The term "(meth)acryl" as used in the present specification collectively refers to methacryl and acryl. The same applies to similar expressions. [α,β-Unsaturated Double Bond Group-Containing Compound (A) Having a Ring Structure (a) containing a Nitrogen Atom]

Since the α,β-unsaturated double bond group-containing compound (A) having a ring structure (a) containing a nitrogen atom (which hereinafter may be simply referred to as "α,β-unsaturated double bond group-containing compound (A)") has a ring structure (a) containing a nitrogen atom, a three-dimensional object fabricated with the resin composition for optical shaping of the present invention has an increased glass-transition point (Tg) after light irradiation because of rigidity attributed to the ring structure. As a result, internal cohesive force is further improved. This makes it possible to form a three-dimensional object having high strength and toughness. Additionally, a nitrogen atom covered by a bulky hydrocarbon group protects a polar functional group, for example, a urethane bond in the resin composition, and a three-dimensional object having desirable water resistance can be formed. From the standpoint of a heteroatom, examples of the ring structure (a) containing a nitrogen atom include a ring structure containing one or more nitrogen atoms alone on the ring structure (a), a ring structure containing both a nitrogen atom and an oxygen atom on the ring structure (a), and a ring structure containing both a nitrogen atom and a sulfur atom on the ring structure (a). Among these, the ring structure containing one or more nitrogen atoms alone on the ring structure (a) is particularly preferred in view of water resistance. The term "on the ring structure (a)" as used in the present invention includes a ring skeleton and an atom directly bonded to the ring skeleton. The term "in the ring structure (a)" refers to a ring skeleton only, and does not include an atom directly bonded to the ring skeleton. Moreover, in view of desirable toughness, the α,β-unsaturated double bond group-containing compound (A) is preferably monofunctional, that is, the α,β-unsaturated double bond group-containing compound (A) preferably contains one α,β-unsaturated double bond group.

The ring structure containing one or more nitrogen atoms alone as heteroatoms on the ring structure (a) is not particularly limited as long as the present invention can exhibit its effects. Examples of the ring structure containing one or more nitrogen atoms alone as heteroatoms on the ring structure (a) include heterocycles containing a nitrogen atom(s) alone, which are typified by: saturated monocycles containing one nitrogen atom, such as ethyleneimine, azetidine, pyrrolidine, piperidine, azepane, quinuclidine, and tropane rings; saturated monocycles containing two or more nitrogen atoms, such as imidazolidine, piperazine, and methenamine rings; unsaturated monocycles containing one nitrogen atom, such as azirine, azete, pyrrole, pyridine, quinuclidine, and azepine rings; unsaturated monocycles containing two or more nitrogen atoms, such as imidazole, indazole, imidazoline, pyrazole, pyrazine, pyrimidine, pyridazine, triazole, triazine, and tetrazole rings; unsaturated polycycles containing one nitrogen atom, such as indole, isoindole, quinoline, isoquinoline, carbazole, and acridine rings; and unsaturated polycycles containing two or more nitrogen atoms, such as benzimidazole, quinoxaline, quinazoline, phthalazine, cinnoline, pteridine, naphthyridine, purine, benzotriazole, phenazine, benzodiazepine, benzo-o-cinnoline, porphyrin, chlorine, and corrin rings. Among these, the saturated monocycles containing one nitrogen atom, the unsaturated monocycles containing one nitrogen atom, and the unsaturated polycycles containing one nitrogen atom are preferred. Pyrrolidine, piperidine, pyridine, indole, and carbazole rings are preferred, pyrrolidine, piperidine, and carbazole rings are more preferred, and piperidine and carbazole rings are even more preferred.

Examples of the ring structure containing both a nitrogen atom and an oxygen atom as heteroatoms on the ring structure (a) include heterocycles containing both a nitrogen atom and an oxygen atom, such as morpholine, lactam, isatin, primidone, oxazine, oxazole, isoxazole, benzoxazine, phenoxazine, benzophenoxazine, phenazone, hydantoin, and phthalocyanine rings.

Examples of the ring structure containing both a nitrogen atom and a sulfur atom as heteroatoms on the ring structure (a) include heterocycles containing both a nitrogen atom and a sulfur atom, such as thiazole, isothiazole, thiazine, thiazoline, thiazolidine, and phenothiazine rings.

As the α,β-unsaturated double bond group-containing compound (A), those having a ring structure containing one or more nitrogen atoms in the structure and containing an α,β-unsaturated double bond group can be used without particular limitation. Conventionally known α,β-unsaturated double bond groups are, for example, (meth)acryloyl, vinyl, N-vinyl, vinyl ester, vinylsilyl, vinyl ether, allyl, methallyl groups, and these can be used without particular limitation. Among these α,β-unsaturated double bond groups, (meth)acryloyl and N-vinyl groups are preferred in view of curability.

Examples of the α,β-unsaturated double bond group-containing compound containing one nitrogen atom alone on the ring structure (a) include: (meth)acrylic acid esters having a nitrogen atom-containing monocyclic structure, such as pentamethyl piperidinyl (meth)acrylate (1,2,2,6,6-pentamethyl-4-piperidyl (meth)acrylate), tetramethyl piperidinyl (meth)acrylate (2,2,6,6-tetramethyl-4-piperidyl (meth)acrylate), piperidinyl (meth)acrylate (4-piperidyl (meth)acrylate), and 4-(pyrimidine-2-yl)piperazine-1-yl (meth)acrylate; (meth)acrylamides having a nitrogen atom-containing monocyclic structure, such as N-(meth)acryloylpyrrolidine, N-(meth)acryloylpiperidine, piperidyl (meth)acrylamide (N-(piperidine-4-yl)(meth)acrylamide), N-(meth)acryloyl-2-methylpiperidine, and N-(meth)acryloyl-2,2,6,6-tetramethylpiperidine; vinyl group-containing compounds having a nitrogen atom-containing five-membered ring, such as 1-vinylpyrrole, 2-vinylpyrrole, 2-methyl-5-vinyl-1H-pyrrole, 1-vinyl-2-imidazoline, 2-vinyl-2-imidazoline, 1-vinyl-2-methyl-2-imidazoline, 4,5-dihydro-2-vinyl-1H-imidazole, 1-vinylimidazole, 2-vinyl-1H-imidazole, 1-vinyl-1H-pyrazole, 1-vinyl-3,5-dimethyl-1H-pyrazole, and 3-methyl-5-phenyl-1-vinylpyrazole; vinyl group-containing compounds having a nitrogen atom-containing six-membered ring, such as 2-vinylpiperazine, 4-vinylpiperazine, 1-benzyl-2-vinylpiperazine, 1-benzyl-3-vinylpiperazine, 1,4-dimethyl-3-vinylpiperazine, 2-vinylpyridine, 3-vinylpyridine, 4-vinylpyridine, 6-methyl-2-vinylpyridine, 2-vinylpyrazine, 2-methyl-5-vinylpyrazine, 2-methyl-6-vinylpyrazine, 2,5-dimethyl-3-vinylpyrazine, 2-vinylpyrimidine, 2-vinylpyridazine, 2-vinyl-4,6-diamino-1,3,5-triazine, 6-vinyl-1,3,5-dimethyl-2,4-diamine, and 3-vinyl-1,2,4,5-tetrazine; vinyl group-containing compounds having an acyl group and a six-membered ring containing a nitrogen atom, such as vinyl nicotinoylacetate, vinyl nicotinoylpropionate, vinyl nicotinoylbutyrate, vinyl nicotinoylvalerate, vinyl nicotinoylhexanoate, vinyl nicotinoyldecanoate, vinyl nicotinoyldodecanoate, vinyl isonicotinoylacetate, vinyl isonicotinoylpropionate, vinyl isonicotinoylbutyrate, vinyl isonicotinoylvalerate, vinyl isonicotinoylhexanoate, vinyl isonicotinoyldecanoate, and vinyl isonicotinoyldodecanoate; vinyl group-containing compounds having a nitrogen atom-containing polycyclic structure, such as 1-vinylindole, 1-vinyl-2-methyl-1H-indole, 1-vinylisoindole, 1-vinyl-1H-benzimidazole, 2-vinyl-1H-benzimidazole, 2-vinyl-5,6-dimethyl-1H-benzimidazole, 1-vinylindazole, 2-vinylquinoline, 4-vinylquinoline, 2-vinylisoquinoline, 2-vinylisoxaline, 2-vinylquinoxaline, 2-vinylquinazoline, 2-vinylcinnoline, 1-vinylcarbazole, and N-vinylcarbazole; compounds containing two or more vinyl groups and having a nitrogen atom-containing monocyclic structure, such as 1-methyl-4,5-divinyl-1H-imidazole, 1,1'-divinyl-2,2'-bi(1H-imidazole), 2,3-divinylpyridine, 2,4-divinylpyridine, 2,5-divinylpyridine, and 2,6-divinylpyridine; (meth)allyl group-containing compounds having a nitrogen atom-containing ring structure, such as 1-(meth)allyl-1H-imidazole (1-allyl-1H-imidazole and 1-methallyl-1H-imidazole are collectively referred to as "1-(meth)allyl-1H-imidazole". The same applies to the following), 1-(meth)allyl-2-methyl-1H-imidazole, 1-(meth)allyl-3-methyl-1H-imidazole-3-ium, 1-(meth)allyl-3-ethyl-1H-imidazole-3-ium, 4-(meth)allyl-3,5-dimethyl-1H-pyrazole, 5-bromo-1-1-(meth)allyl-1H-pyrazole, 1-(meth)allylpiperazine, 5-(1-methylpropyl)-5-(meth)allylpyrimidine, 5-(meth)allyl-5-isopropylpyrimidine, 1-(meth)allyl-5,5-diethylpyrimidine, 2-(meth)allylpyridine, 4-(meth)allylpyridine, and 3,6-dihydro-3-(meth)allylpyridine; and (meth)allyl group-containing compounds having a nitrogen atom-containing polycyclic structure, such as 2-(meth)allyl-1H-indole, 3-(meth)allyl-1H-indole, 1-(meth)allyl-1H-benzimidazole, 2-(meth)allylindazole, 1-(meth)allyl-3-methyl-1H-indazole, 1-(meth)allyl-4-methyl-1H-indazole, N-(meth)allylquinoline-4-amine, di(meth)allylquinoline, 3-phenyl-4-(meth)allylisoquinoline, 1,2-di(meth)allyl-1,2-dihydroisoquinoline, and 9-(meth)allyl-9H-carbazole. Among these, pentamethyl piperidinyl (meth)acrylate, tetramethyl piperidinyl (meth)acrylate, 1-vinylpyrrole, 2-vinylpyrrole, 2-methyl-5-vinyl-1H-pyrrole, 2-vinylpyridine, 3-vinylpyridine, 4-vinylpyridine, 6-methyl-2-vinylpyridine, 1-vinylindole, 1-vinyl-2-methyl-1H-indole, 1-vinylisoindole, and N-vinylcarbazole are more preferred, pentamethyl piperidinyl (meth)acrylate, tetramethyl piperidinyl (meth)acrylate, 1-vinylindole, 1-vinyl-2-methyl-1H-indole, 1-vinylisoindole, and N-vinylcarbazole are even more preferred, and pentamethyl piperidinyl (meth)acrylate, 1-vinylindole, and N-vinylcarbazole are most preferred in view of desirable toughness and water resistance of a cured product of the resin composition for optical shaping of the present invention.

Examples of the α,β-unsaturated double bond group-containing compound containing two or more nitrogen atoms alone on the ring structure (a) include: (meth)acrylic acid esters having a nitrogen atom-containing polycyclic structure, such as 2-(2'-hydroxy-5'-(meth)acryloyloxyethylphenyl)-2H-benzotriazole, 2-(2'-hydroxy-5'-(meth)acryloyloxyethylphenyl)-5-chloro-2H-benzotriazole, 2-(2'-hydroxy-5'-(meth)acryloyloxypropylphenyl)-2H-benzotriazole, 2-(2'-hydroxy-5'-(meth)acryloyloxypropylphenyl)-5-chloro-2H-benzotriazole, 2-(2'-hydroxy-3'-tert-butyl-5'-(meth)acryloyloxyethylphenyl)-2H-benzotriazole, and 2-(2'-hydroxy-3'-tert-butyl-5'-(meth)acryloyloxyethylphenyl)-5-chloro-2H-benzotriazole; and (meth)acrylic acid esters having a nitrogen atom-containing six-membered ring, such as 2,4-diphenyl-6-[2-hydroxy-4-{2-(meth)acryloyloxyethoxy}]-S-triazine, 2,4-bis(2-methylphenyl)-6-[2-hydroxy-4-{2-(meth)acryloyloxyethoxy}]-S-triazine, 2,4-bis(2-methoxyphenyl)-6-[2-hydroxy-4-{2-(meth)acryloyloxyethoxy}]-S-triazine, 2,4-bis(2-ethylphenyl)-6-[2-hydroxy-4-{2-(meth)acryloyloxyethoxy}]-S-triazine, 2,4-bis(2-ethoxyphenyl)-6-[2-hydroxy-4-{2-(meth)acryloyloxyethoxy}]-S-triazine, 2,4-bis(2,4-dimethylphenyl)-6-[2-hydroxy-4-{2-(meth)acryloyloxyethoxy}]-S-triazine, 2,4-bis(2,4-diethoxyphenyl)-6-[2-hydroxy-4-{2-(meth)acryloyloxyethoxy}]-S-triazine, and 2,4-bis(2,4-diethylphenyl)-6-[2-hydroxy-4-{2-(meth)acryloyloxyethoxy}]-S-triazine.

Examples of the α,β-unsaturated double bond group-containing compound containing both a nitrogen atom and an oxygen atom on the ring structure (a) include: (meth)acrylic acid esters having a ring structure containing an oxygen atom in addition to a nitrogen atom, such as imide (meth)acrylate, 2-(4-oxazoline-3-yl)ethyl (meth)acrylate, ethoxylated isocyanuric acid tri(meth)acrylate, and ε-caprolactone modified tris-(2-acryloyloxyethyl) isocyanurate; (meth)acrylamides having a ring structure, such as 4-acryloylmorpholine; N-vinyl group-containing compounds having a ring structure containing both a nitrogen atom and an oxygen atom, such as N-vinyl-2-pyrrolidone and N-vinyl-c-caprolactam; maleimide derivatives containing both a nitrogen atom and an oxygen atom, such as maleimide, methylmaleimide, ethylmaleimide, propylmaleimide, butylmaleimide, octylmaleimide, dodecylmaleimide, stearylmaleimide, phenylmaleimide, and cyclohexylmaleimide; and ethenyl group-containing compounds having a ring structure containing an oxygen atom in addition to a nitrogen atom, such as 2-vinyloxazole, 2-phenyl-4-vinyloxazole, 2-phenyl-5-vinyloxazole, 5-ethoxy-2-vinyloxazole, 3-vinyl-5-nitrosooxazole, 2-vinyl-4,5-diphenyloxazole, 2-vinyl-2-oxazoline, 4,4-dimethyl-2-vinyl-2-oxazoline-5-one, 2-vinylbenzoxazole, and 1-vinylpyridine-2(1H)-one.

Examples of the α,β-unsaturated double bond group-containing compound containing both a nitrogen atom and a sulfur atom on the ring structure (a) include: vinyl group-containing compounds having a ring structure containing a sulfur atom in addition to a nitrogen atom, such as 2-vinylthiazole, 4-methyl-5-vinylthiazole, 2-vinylbenzothiazole, 2-[2-(1-naphthyl)vinyl]benzothiazole, 2-[2-(dimethylamino)vinyl]benzothiazole, and 1-vinyl-2(1H)-pyridinethione. The α,β-unsaturated double bond group-containing compound containing both a nitrogen atom and a sulfur atom on the ring structure (a) are not particularly limited to these. The α,β-unsaturated double bond group-containing compound (A) may be used alone, or two or more thereof may be used in combination.

The α,β-unsaturated double bond group-containing compound (A) of the present invention preferably contains neither an oxygen atom nor a sulfur atom in the ring structure (a). When an atom belonging to Group 6B (Group 16) of the periodic table is contained in the ring structure (a) in addition to a nitrogen atom, hydrophilicity is enhanced and that may decrease the water resistance of a three-dimensional object. The ring structure (a) containing a nitrogen atom is preferably a five- or higher membered ring. It is not preferable that the ring structure (a) containing a nitrogen atom be a three- or four membered ring because the ring is likely to undergo a ring-opening reaction by heat or an active energy beam. Moreover, the number of nitrogen atoms on the ring structure (a) is preferably one. A plurality of nitrogen atoms on the ring structure (a) may decrease the water resistance of a three-dimensional object. Therefore, the α,β-unsaturated double bond group-containing compound having the ring structure (a) containing only one nitrogen atom alone is most preferred.

The α,β-unsaturated double bond group-containing compound (A) of the present invention preferably comprises an N-vinyl group-containing compound (A)-1 having the ring structure (a) in view of fabricability and toughness. The α,β-unsaturated double bond group-containing compound (A) more preferably comprises a (meth)acrylic acid ester (A)-2 having the ring structure (a) and/or a (meth)acrylamide (A)-3 having the ring structure (a) in addition to the N-vinyl group-containing compound (A)-1. Examples of the N-vinyl group-containing compound (A)-1 include an N-vinyl group-containing compound (A)-1a having a nitrogen atom-containing monocyclic structure and an N-vinyl group-containing compound (A)-1b having a nitrogen atom-containing polycyclic structure. Examples of the (meth)acrylic acid ester (A)-2 include a (meth)acrylic acid ester (A)-2a having a nitrogen atom-containing monocyclic structure and a (meth)acrylic acid ester (A)-2b having a nitrogen atom-containing polycyclic structure. Examples of the (meth)acrylamide (A)-3 having the ring structure (a) include a (meth)acrylamide (A)-3a having a nitrogen atom-containing monocyclic structure and a (meth)acrylamide (A)-3b having a nitrogen atom-containing polycyclic structure.

In the α,β-unsaturated double bond group-containing compound (A) of the present invention, the ring structure (a) containing a nitrogen atom is preferably a piperidine ring in view of toughness and water resistance.

The content of the α,β-unsaturated double bond group-containing compound (A) in the resin composition for optical shaping of the present invention is preferably 1.0 to 80 mass % relative to the total amount of the α,β-unsaturated double bond group-containing compound (A), the (meth)acrylic acid ester compound (B) having a boiling point of 280° C. or more at normal pressure, having a carbocyclic group, and having no nitrogen-containing heterocyclic group, and a urethanized (meth)acrylic compound (D). In view of improving fabricability and providing a cured product having improved toughness and water resistance, the content of the α,β-unsaturated double bond group-containing compound (A) is more preferably 5 to 70 mass %, even more preferably 10 to 60 mass %.

[(Meth)Acrylic Acid Ester Compound (B) Having a Boiling Point of 280° C. or More at Normal Pressure, Having a Carbocyclic Group, and Having No Nitrogen-Containing Heterocyclic Group]

The resin composition for optical shaping of the present invention comprises the (meth)acrylic acid ester compound (B) having a boiling point of 280° C. or more at normal pressure, having a carbocyclic group, and having no nitrogen-containing heterocyclic group (which hereinafter may be simply referred to as "(meth)acrylic acid ester compound (B)"). The (meth)acrylic acid ester compound (B) is comprised in the resin composition for optical shaping of the present invention to impart toughness and water resistance to a cured product of the resin composition for optical shaping.

The (meth)acrylic acid ester compound (B) of the present invention has a boiling point of 280° C. or more at normal pressure and thus can reduce odor. The resin composition for optical shaping of the present invention is likely to emit a weaker unpleasant odor. The (meth)acrylic acid ester compound (B) preferably has a boiling point of 300° C. or more at normal pressure and more preferably has a boiling point of 320° C. or more at normal pressure. In the present specification, a boiling point at normal pressure is a measured value obtained by atmospheric distillation. For compounds for which boiling points at normal pressure are not observable, their boiling points at reduced pressure, i.e., measured values obtained by vacuum distillation, are converted into boiling points at normal pressure using the pressure-temperature nomograph (The Science of Petroleum, Vol. II. p. 1281 (1938)).

It is important for the (meth)acrylic acid ester compound (B) of the present invention to have a carbocyclic group and have no nitrogen-containing heterocyclic group. If the (meth)acrylic acid ester compound (B) had a nitrogen-containing heterocyclic group, a cured product of the resulting resin composition for optical shaping would have poor water resistance. With a carbocyclic group in the (meth)acrylic acid ester compound (B), the resin composition for optical shaping has desirable curability and a cured product thereof has desirable toughness. The (meth)acrylic acid ester compound (B) preferably does not contain a nitrogen atom.

The (meth)acrylic acid ester compound (B) of the present invention preferably comprises a monofunctional (meth)acrylic acid ester compound in view of desirable toughness of a cured product to be obtained. The (meth)acrylic acid ester compound (B) may be used alone, or two or more thereof may be used in combination.

The carbocyclic group is not particularly limited as long as constituted by carbon atoms. Examples of the carbocyclic group include: cycloalkanes, such as biphenyl, phenoxybenzene, bicyclo[1.1.1]pentane, (1r,4r)-bicyclo[2.1.1]hexane, (1s,4s)-bicyclo[2.2.1]heptane (also known as a norbornane ring), bicyclo[2.2.2]octane, (1r,5r)-bicyclo[3.1.1]heptane, (1R,5S)-bicyclo[3.2.1]octane, (1R,5S)-bicyclo[3.3.1]nonane, bicyclo[3.3.2]decane, bicyclo[3.3.3]undecane, (1r,6r)-bicyclo[4.2.2]decane, (1r,6r)-bicyclo[4.3.2]undecane, (1r,6r)-bicyclo[4.3.3]dodecane, (1R,6S)-bicyclo[4.2.1]nonane, (1R,6S)-bicyclo[4.3.1]decane, (3aR,4R,7S,7a5)-octahydro-1H-4,7-methanoindene (also known as a dicyclopentanyl ring), (1R,4S,4as,5R,8S)-decahydro-1,4:5,8-dimethanonaphthalene (also known as a tetracyclododecanyl ring), tricyclo[1.1.0.0$^{2,4}$]butane, pentacyclo[2.1.0.0$_{1,3}$.0$^{2,4}$.0$^{2,5}$]pentane, tetracyclo[2.1.0$^{1,3}$0.0$^{2,5}$]pentane, heptacyclo[2.2.0.0$^{1,3}$.0$^{2,5}$.0$^{2,6}$.0$^{3,5}$.0$^{4,6}$]hexane, adamantane, (1s,4s)-bicyclo[2.2.1]hept-2-ene (also known as a norbornene ring), (3aR,4R,7R,7aR)-hexahydro-1H-4,7-methanoindene (also known as a dicyclopentenyl ring), (1R,4S,5S,8R,8aR)-1,2,3,4,4a,5,8,8a-octahydro-1,4:5,8-methanonaphthalene (also known as a tricyclododecanyl ring), [1,1]paracyclophane, [2,2]paracyclophane, [2,2]metacyclophane, [2,2,2,2](1,2,4,5)cyclophane, 9,10-dihydro-9,10-[1,2]benzenoanthracene, cyclopentane, cyclohexane, cycloheptane, cyclooctane, cyclononane, cyclodecane, cyclododecane, cyclohexadecane, (1s,3s)-bicyclo[1.1.0]butane, (1R,4S)-bicyclo[2.1.0]pentane, (1R,5s)-bicyclo[3.1.0]hexane, (1R,5s)-bicyclo[3.2.0]heptane, (3as,6as)-octahydropentalene, (1R,6S)-bicyclo[4.1.0]heptane, (1R,6S)-bicyclo[4.2.0]octane, (3aR,7aS)-octahydro-1H-indene, (4as,8as)-decahydronaphthalene, (4ar,8ar)-decahydronaphthalene, decahydronaphthalene, and tetradecahydronaphthalene rings; cycloalkenes such as cyclopentene, cyclohexene, cycloheptene, cyclooctene, cyclobutadiene, cyclopentadiene, cyclohexadiene, cycloheptadiene, cyclooctadiene, octahydronaphthalene, and dodecahydroanthracene rings; [4n+2]annulenes having a ring constituted by three or more carbons, such as benzene, cyclooctatetraene, cyclotetradecaheptaene, and cyclooctadecanonaene rings; fused bicyclic aromatic rings, such as naphthalene, pentalene, indene, indane, tetralin, and azulene rings; and carbon fused tricycles, such as as-indacene, s-indacene, biphenylene, acenaphthylene, acenaphthene, fluorene, phenalene, perinaphthene, phenanthrene, and anthracene rings, and can be used without particular limitation.

The (meth)acrylic acid ester compound (B) of the present invention preferably comprises a monofunctional (meth) acrylic acid ester compound (B)-1 whose homopolymer has a glass transition temperature of 40° C. or less (which hereinafter may be simply referred to as "(meth)acrylic acid ester compound (B)-1") in view of toughness. In order to improve the strength of a cured product of the resin composition for optical shaping, a monofunctional (meth)acrylic acid ester compound (B)-2 whose homopolymer has a glass transition temperature of more than 40° C. (which hereinafter may be simply referred to as "(meth)acrylic acid ester compound (B)-2") can be comprised as the (meth)acrylic acid ester compound (B). The glass transition temperature (Tg) of the (meth)acrylic acid ester compound (B) can be measured by a conventionally known method using a viscoelasticity measuring apparatus (rheometer) or a differential scanning calorimeter (DSC). For example, the glass transition temperature (Tg) can be determined by dynamic viscoelastic measurement of the (meth)acrylic compound (A) using a rotational rheometer ("AR2000" manufactured by TA Instruments Japan Inc.). In this dynamic viscoelastic measurement, the frequency is set to 10 Hz, the load is set to 10 N, the displacement is set to 0.1%, and the torque is set to 20 μNm, and the temperature at which tan δ reaches a peak is defined as the glass transition temperature Tg.

Examples of the (meth)acrylic acid ester compound (B)-1 include: aromatic ring-containing monofunctional (meth) acrylic acid ester compounds, such as o-phenylphenol (meth)acrylate, m-phenylphenol (meth)acrylate, p-phenylphenol (meth)acrylate, methoxylated-o-phenylphenol (meth)acrylate, methoxylated-m-phenylphenol (meth)acrylate, methoxylated-p-phenylphenol (meth)acrylate, ethoxylated-o-phenylphenol (meth)acrylate, ethoxylated-m-phenylphenol (meth)acrylate, ethoxylated-p-phenylphenol (meth)acrylate, propoxylated-o-phenylphenol (meth)acrylate, propoxylated-m-phenylphenol (meth)acrylate, propoxylated-p-phenylphenol (meth)acrylate, butoxylated-o-phenylphenol (meth)acrylate, butoxylated-m-phenylphenol (meth)acrylate, butoxylated-p-phenylphenol (meth)acrylate, o-phenoxybenzyl (meth)acrylate, m-phenoxybenzyl (meth)acrylate, p-phenoxybenzyl (meth)acrylate, 2-(o-phenoxyphenyl)ethyl (meth)acrylate, 2-(m-phenoxyphenyl)ethyl (meth)acrylate, 2-(p-phenoxyphenyl)ethyl (meth)acrylate, 3-(o-phenoxyphenyl)propyl (meth)acrylate, 3-(m-phenoxyphenyl)propyl (meth)acrylate, 3-(p-phenoxyphenyl)propyl (meth)acrylate, 4-(o-phenoxyphenyl)butyl (meth)acrylate, 4-(m-phenoxyphenyl)butyl (meth)acrylate, 4-(p-phenoxyphenyl)butyl (meth)acrylate, 5-(o-phenoxyphenyl)pentyl (meth)acrylate, 5-(m-phenoxyphenyl)pentyl (meth)acrylate, 5-(p-phenoxyphenyl)pentyl (meth)acrylate, 6-(o-phenoxyphenyl)hexyl (meth)acrylate, 6-(m-phenoxyphenyl)hexyl (meth)acrylate, and 6-(p-phenoxyphenyl)hexyl (meth)acrylate. Monofunctional (meth)acrylic acid ester compounds having two or more aromatic rings are preferred. One of these may be used alone, or two or more thereof may be used in combination. Among these, the (meth)acrylic acid ester compound (B)-1 is more preferably o-phenoxybenzyl acrylate, m-phenoxybenzyl acrylate, p-phenoxybenzyl acrylate, 2-(o-phenoxyphenyl)ethyl acrylate, 2-(m-phenoxyphenyl)ethyl acrylate, or 2-(p-phenoxyphenyl)ethyl acrylate, even more preferably o-phenoxybenzyl acrylate, m-phenoxybenzyl acrylate, or p-phenoxybenzyl acrylate, particularly preferably o-phenoxybenzyl acrylate or m-phenoxybenzyl acrylate, most preferably m-phenoxybenzyl acrylate, in view of desirable curability of the resin composition for optical shaping and desirable toughness and water resistance of a cured product.

The content of the (meth)acrylic acid ester compound (B)-1 in the resin composition for optical shaping of the present invention is preferably 1.0 to 80 mass % relative to the total amount of the α,β-unsaturated double bond group-containing compound (A), the (meth)acrylic acid ester compound (B), and the urethanized (meth)acrylic compound (D). In view of improving fabricability and providing a cured product having improved toughness and water resistance, the content of the (meth)acrylic acid ester compound (B)-1 is more preferably 5 to 70 mass %, even more preferably 10 to 60 mass %.

Examples of the (meth)acrylic acid ester compound (B)-2 include: cyclic (meth)acrylic acid esters such as 2-(1-adamantyl)propyl (meth)acrylate, 2-methyladamantyl-2-yl (meth)acrylate, 2-ethyladamantyl-2-yl (meth)acrylate, 2-n-propyladamantyl-2-yl (meth)acrylate, 2-isopropyladamantyl-2-yl (meth)acrylate, 1-(adamantane-1-yl)-1-methylethyl (meth)acrylate, 1-(adamantane-1-yl)-1-ethylethyl (meth)acrylate, 1-(adamantane-1-yl)-1-methylpropyl (meth)acrylate, and 1-(adamantane-1-yl)-1-ethylpropyl (meth)acrylate; 4-biphenylyl (meth)acrylate; 2-oxo-1,2-diphenylethyl (meth)acrylate; 1-naphthyl (meth)acrylate; 2-naphthyl (meth)acrylate; 1-naphthylmethyl (meth)acrylate; 1-anthryl (meth)acrylate; 2-anthryl (meth)acrylate; 9-anthryl (meth) acrylate; 9-anthrylmethyl (meth)acrylate; o-2-propenylphenyl (meth)acrylate; and trityl (meth)acrylate.

The content of the (meth)acrylic acid ester compound (B)-2 in the resin composition for optical shaping of the present invention is preferably 1.0 to 60 mass % relative to the total amount of the α,β-unsaturated double bond group-containing compound (A), the (meth)acrylic acid ester compound (B), and the urethanized (meth)acrylic compound (D). In view of improving fabricability and providing a cured product having improved toughness and water resistance, the content of the (meth)acrylic acid ester compound (B)-2 is more preferably 5 to 40 mass %, even more preferably 10 to 20 mass %.

The content of the (meth)acrylic acid ester compound (B) in the resin composition for optical shaping of the present invention is preferably 1.0 to 99 mass % relative to the total amount of the α,β-unsaturated double bond group-containing compound (A), the (meth)acrylic acid ester compound (B), and the urethanized (meth)acrylic compound (D). In view of improving fabricability and providing a cured product having improved toughness and water resistance, the content of the (meth)acrylic acid ester compound (B) is more preferably 5 to 90 mass %, even more preferably 10 to 80 mass %.

[Photopolymerization Initiator (C)]

The photopolymerization initiator (C) used in the present invention can be selected from photopolymerization initiators used in general industrial fields, preferably from photopolymerization initiators for dental use.

Examples of the photopolymerization initiator (C) include (bis)acylphosphine oxides, thioxanthones or quaternary ammonium salts of thioxanthones, ketals, α-diketones, coumarins, anthraquinones, benzoin alkyl ether compounds, and α-aminoketone compounds. The photopolymerization initiator (C) may be used alone, or two or more thereof may be used in combination.

Preferably, the photopolymerization initiator (C) is at least one selected from the group consisting of (bis)acylphosphine oxides and α-diketones. In this case, the resulting resin composition for optical shaping can have good photocurability under ultraviolet or visible light irradiation and show sufficient photocurability when irradiated using any light source selected from a laser, a halogen lamp, a light-emitting diode (LED), and a xenon lamp.

Examples of acylphosphine oxides in the (bis)acylphosphine oxides include 2,4,6-trimethylbenzoyldiphenylphosphine oxide, 2,6-dimethoxybenzoyldiphenylphosphine oxide, 2,6-dichlorobenzoyldiphenylphosphine oxide, 2,4,6-trimethylbenzoylmethoxyphenylphosphine oxide, 2,4,6-trimethylbenzoylethoxyphenylphosphine oxide, 2,3,5,6-tetramethylbenzoyldiphenylphosphine oxide, benzoyl di(2,6-dimethylphenyl)phosphonate, sodium salts of 2,4,6-trimethylbenzoylphenylphosphine oxide, potassium salts of 2,4,6-trimethylbenzoylphenylphosphine oxide, and ammonium salts of 2,4,6-trimethylbenzoyldiphenylphosphine oxide. Examples of bisacylphosphine oxides include bis(2,6-dichlorobenzoyl)phenylphosphine oxide, bis(2,6-dichlorobenzoyl)-2,5-dimethylphenylphosphine oxide, bis(2,6-dichlorobenzoyl)-4-propylphenylphosphine oxide, bis(2,6-dichlorobenzoyl)-1-naphthylphosphine oxide, bis(2,6-dimethoxybenzoyl)phenylphosphine oxide, bis(2,6-dimethoxybenzoyl)-2,4,4-trimethylpentylphosphine oxide, bis(2,6-dimethoxybenzoyl)-2,5-dimethylphenylphosphine oxide, bis(2,4,6-trimethylbenzoyl)phenylphosphine oxide, and bis(2,5,6-trimethylbenzoyl)-2,4,4-trimethylpentylphosphine oxide. Other examples include the compounds mentioned in JP 2000-159621 A.

Among these (bis)acylphosphine oxides, particularly preferred as the photopolymerization initiator (C) are 2,4,6-trimethylbenzoyldiphenylphosphine oxide, 2,4,6-trimethylbenzoylmethoxyphenylphosphine oxide, bis(2,4,6-trimethylbenzoyl)phenylphosphine oxide, and sodium salts of 2,4,6-trimethylbenzoyldiphenylphosphine oxide.

Examples of the α-diketones include diacetyl, benzyl, camphorquinone, 2,3-pentadione, 2,3-octadione, 9,10-phenanthrenequinone, 4,4'-oxybenzyl, and acenaphthenequinone. Camphorquinone is particularly preferred when the light source used is a visible-light source.

The content of the photopolymerization initiator (C) in the resin composition for optical shaping of the present invention is not particularly limited, as long as the present invention can exhibit its effects. However, in view of curability and other properties of the resulting resin composition for optical shaping, the content of the photopolymerization initiator (C) is preferably 0.01 to 20 parts by mass relative to total 100 parts by mass of the α,β-unsaturated double bond group-containing compound (A), the (meth) acrylic acid ester compound (B), and the urethanized (meth) acrylic compound (D). When the content of the photopolymerization initiator (C) is less than 0.01 parts by mass, polymerization may not sufficiently proceed, resulting in a failure to obtain a shaped product or a three-dimensional object. The content of the photopolymerization initiator (C) is more preferably 0.05 parts by mass or more, even more preferably 0.1 parts by mass or more, particularly preferably 0.5 parts by mass or more relative to total 100 parts by mass of the above compounds. When the content of the photopolymerization initiator (C) is more than 20 parts by mass and the photopolymerization initiator itself has a low solubility, the photopolymerization initiator (C) may precipitate out of the resin composition for optical shaping. The content of the photopolymerization initiator (C) is more preferably 15 parts by mass or less, even more preferably 10 parts by mass or less, particularly preferably 5.0 parts by mass or less relative to total 100 parts by mass of the above compounds.

[Urethanized (Meth)Acrylic Compound (D)]

The resin composition for optical shaping of the present invention preferably further comprises the urethanized (meth)acrylic compound (D). The urethanized (meth)acrylic compound (D) is used to impart curability and low viscosity to the resin composition for optical shaping of the present invention and to impart toughness to a cured product of the resin composition for optical shaping.

The urethanized (meth)acrylic compound (D) can be synthesized with ease through addition reaction of, for example, a polyol having any of later-described polymer skeletons, a compound having an isocyanate group (—NCO), and a (meth)acrylic compound having a hydroxyl group (—OH). Alternatively, the urethanized (meth)acrylic compound (D) can be synthesized with ease through ring-opening addition reaction of a (meth)acrylic compound having a hydroxyl group with a lactone or an alkylene oxide and then addition reaction of the resulting compound having a hydroxyl group at one terminal with a compound having an isocyanate group. The urethanized (meth)acrylic compound (D) may be used alone, or two or more thereof may be used in combination. The urethanized (meth)acrylic compound (D) may have the ring structure (a), but preferably does not have the ring structure (a).

The urethanized (meth)acrylic compound (D) is preferably a (meth)acrylate having, per molecule, a urethane bond and at least one structure (polymer skeleton) selected from the group consisting of a polyester, a polycarbonate, a polyurethane, a polyether, a poly(conjugated diene), and a hydrogenated poly(conjugated diene), more preferably a (meth)acrylate having, per molecule, a urethane bond and at least one polyol moiety selected from the group consisting of a polyester, a polycarbonate, a polyurethane, a polyether, a poly(conjugated diene), and a hydrogenated poly(conjugated diene) each having a structure derived from a C4 to C18 aliphatic diol unit (d) having a branched structure. As to the above structure (polymer skeleton), examples of the polyester include a polymer of a dicarboxylic acid (an aromatic dicarboxylic acid such as phthalic acid or isophthalic acid; or an unsaturated aliphatic dicarboxylic acid such as maleic acid) and a C2 to C18 aliphatic diol, a polymer of a dicarboxylic acid (a saturated aliphatic dicarboxylic acid such as adipic acid or sebacic acid) and a C2 to C18 aliphatic glycol, a ß-propiolactone polymer, a γ-butyrolactone polymer, a δ-valerolactone polymer, an ε-caprolactone polymer, and copolymers thereof, and preferred are a polymer of a dicarboxylic acid (an aromatic dicarboxylic acid such as phthalic acid or isophthalic acid; or an unsaturated aliphatic dicarboxylic acid such as maleic acid) and a C2 to C12 aliphatic diol and a polymer of a dicarboxylic acid (a saturated aliphatic dicarboxylic acid such as adipic acid or sebacic acid) and a C2 to C12 aliphatic glycol. Examples of the polycarbonate include polycarbonates derived from a C2 to C18 aliphatic diol, polycarbonates derived from bisphenol A, and polycarbonates derived from a C2 to C18 aliphatic diol and bisphenol A, and preferred are polycarbonates derived from a C2 to C12 aliphatic diol, polycarbonates derived from bisphenol A, and polycarbonates derived from a C2 to C12 aliphatic diol and bisphenol A. Examples of the polyurethane include a polymer of a C2 to C18 aliphatic diol and a C1 to C18 diisocyanate, and preferred is a polymer of a C2 to C12 aliphatic diol and a C1 to C12 diisocyanate. Examples of the polyether include polyethylene glycol, polypropylene glycol, polybutyleneglycol, and poly(1-methylbutyleneglycol). Examples of the poly(conjugated diene) and the hydrogenated poly(conjugated diene) include 1,4-polybutadiene, 1,2-polybutadiene, polyisoprene, poly(butadiene-isoprene), poly(butadiene-styrene), poly(isoprene-styrene), polyfarnesene, and their hydrogenated products. Among these, the structures of the polyesters are preferred in view of desirable toughness. Moreover, in view of desirable water resistance and toughness, the structures of the polyesters preferably comprise a polyol moiety having a structure derived from a C4 to C18 aliphatic diol unit (d) having a branched structure and an isophthalic acid ester or a sebacic acid ester. In view of desirable water resistance and fabricability, the structures of the polyesters more preferably comprise a polyol moiety having a structure derived from a C4 to C12 aliphatic diol unit (d) having a branched structure and an isophthalic acid ester or a sebacic acid ester, and even more preferably comprise a polyol moiety having a structure derived from a C5 to C12 aliphatic diol unit (d) having a branched structure and an isophthalic acid ester or a sebacic acid ester. A polyol having any of the above polymer skeletons can be used to produce the urethanized (meth)acrylic compound (D).

Examples of the compound having an isocyanate group include hexamethylene diisocyanate (HDI), tolylene diisocyanate (TDI), xylylene diisocyanate (XDI), diphenylmethane diisocyanate (MDI), isophorone diisocyanate (IPDI), trimethylhexamethylene diisocyanate (TMHMDI), tricyclodecane diisocyanate (TCDDI), and adamantane diisocyanate (ADI).

Examples of the (meth)acrylic compound having a hydroxyl group include: hydroxy(meth)acrylate compounds such as 2-hydroxyethyl (meth)acrylate, 2-hydroxypropyl (meth)acrylate, 2-hydroxybutyl (meth)acrylate, 6-hydroxyhexyl (meth)acrylate, 10-hydroxydecyl (meth)acrylate, 3-chloro-2-hydroxypropyl (meth)acrylate, 2-hydroxy-3-phenoxypropyl (meth)acrylate, glycerin mono(meth)acrylate, 2-hydroxy-3-acryloyloxypropyl (meth)acrylate, 2,2-bis[4-[3-(meth)acryloyloxy-2-hydroxypropoxy]phenyl] propane, 1,2-bis[3-(meth)acryloyloxy-2-hydroxypropoxy]ethane, pentaerythritol tri(meth)acrylate, and dipentaerythritol tri(meth)acrylate or dipentaerythritol tetra(meth)acrylate; and hydroxy(meth)acrylamide compounds such as N-hydroxyethyl (meth)acrylamide and N,N-bis(2-hydroxyethyl) (meth)acrylamide.

Examples of the C4 to C18 aliphatic diol unit (d) having a branched structure include 2-methyl-1,3-propanediol, 2,2-diethyl-1,3-propanediol, 1,3-butanediol, 2-methyl-1,4-butanediol, neopentyl glycol, 3-methyl-1,5-pentanediol, 2-methyl-1,8-octanediol, 2,7-dimethyl-1,8-octanediol, 2-methyl-1,9-nonanediol, 2,8-dimethyl-1,9-nonanediol, 2-methyl-1,10-decanediol, 2,9-dimethyl-1,10-decanediol, 2-methyl-1,11-undecanediol, 2,10-dimethyl-1,11-undecanediol, 2-methyl-1,12-dodecanediol, 2,11-dimethyl-1,12-dodecanediol, 2-methyl-1,13-tridecanediol, 2,12-dimethyl-1,13-tridecanediol, 2-methyl-1,14-tetradecanediol, 2,13-dimethyl-1,14-tetradecanediol, 2-methyl-1,15-pentadecanediol, 2,14-dimethyl-1,15-pentadecanediol, 2-methyl-1,16-hexadecanediol, and 2,15-dimethyl-1,16-hexadecanediol. In view of providing a resin composition for optical shaping having desirable curability and low viscosity, the polyol components used are preferably C5 to C12 aliphatic diols having a methyl-group side chain, for example, such as 2-methyl-1,4-butanediol, 3-methyl-1,5-pentanediol, 2-methyl-1,8-octanediol, 2,7-dimethyl-1,8-octanediol, 2-methyl-1,9-nonanediol, and 2,8-dimethyl-1,9-nonanediol. The polyol components are more preferably 2-methyl-1,4-butanediol, 3-methyl-1,5-pentanediol, 2-methyl-1,8-octanediol, and 2,7-dimethyl-1,8-octanediol, even more preferably 3-methyl-1,5-pentanediol and 2-methyl-1,8-octanediol.

The addition reaction between the compound having an isocyanate group and the (meth)acrylic compound having a hydroxyl group is not particularly limited, and may be carried out according to a known method.

The urethanized (meth)acrylic compound (D) produced by the reaction is, for example, a reaction production of any combination of the above at least one polyol having a structure selected from the group consisting of the polyester, polycarbonate, polyurethane, polyether, poly(conjugated diene), and hydrogenated poly(conjugated diene); the above compound having an isocyanate group; and the above (meth)acrylic compound having a hydroxyl group.

In view of viscosity and strength, the urethanized (meth)acrylic compound (D) has a weight-average molecular weight (Mw) of preferably 1,000 to 30,000, more preferably 1,500 to 15,000, even more preferably 2,000 to 5,000. In the present specification, the weight-average molecular weight (Mw) means a weight-average molecular weight determined in terms of polystyrene by gel permeation chromatography (GPC).

The content of the urethanized (meth)acryl compound (D) in the resin composition for optical shaping of the present invention is preferably 1 to 98 mass % relative to the total amount of the α,β-unsaturated double bond group-containing compound (A), the (meth)acrylic acid ester compound (B), and the urethanized (meth)acryl compound (D). In view of improving fabricability and providing a cured product having improved flexibility, shock absorption ability, fracture resistance, and water resistance, the content of the urethanized (meth)acryl compound (D) is more preferably 5 to 90 mass %, even more preferably 10 to 80 mass %.

[Polyfunctional Polymerizable Monomer (E) Having a Molecular Weight of 500 or Less]

In view of toughness, the resin composition for optical shaping of the present invention optionally comprises the polyfunctional polymerizable monomer (E) having a molecular weight of 500 or less and not comprised in the α,β-unsaturated double bond group-containing compound (A) and the (meth)acrylic acid ester compound (B) (which hereinafter may be simply referred to as "polyfunctional polymerizable monomer (E) having a molecular weight of 500 or less"). It is important that the content of the polyfunctional polymerizable monomer (E) having a molecular weight of 500 or less is 20 mass % or less relative to the total amount of polymerizable compounds comprised in the resin composition for optical shaping. The content of the polyfunctional polymerizable monomer (E) having a molecular weight of 500 or less is preferably 10 mass % or less, more preferably 5 mass % or less, even more preferably 0 mass % or less (that is, the polyfunctional polymerizable monomer (E) having a molecular weight of 500 or less is not comprised). Examples of the polyfunctional polymerizable monomer (E) having a molecular weight of 500 or less include: bifunctional polymerizable monomers such as neopentyl glycol di(meth)acrylate, dicyclopentanyl di(meth)acrylate, (glycerol di(meth)acrylate, ethylene glycol di(meth)acrylate, diethylene glycol di(meth)acrylate, triethylene glycol di(meth)acrylate, propylene glycol di(meth)acrylate, butylene glycol di(meth)acrylate, neopentyl glycol di(meth)acrylate, 1,3-butanediol di(meth)acrylate, 1,4-butanediol di(meth)acrylate, 1,6-hexanediol di(meth)acrylate, 2-ethyl-1,6-hexanediol di(meth)acrylate, 1,9-nonanediol di(meth)acrylate, 1,10-decanediol di(meth)acrylate, 1,2-bis(3-(meth)acryloyloxy-2-hydroxypropoxy)ethane, 2,2-bis((meth)acryloyloxyphenyl)propane, 2,2-bis[4-(3-(meth)acryloyloxy-2-hydroxyprop oxy)phenyl]propane), 2,2-bis(4-(meth)acryloyloxyethoxyphenyl)propane, and 2,2-bis(4-

(meth)acryloyloxypolyethoxyphenyl)propane (a compound in which the average number of moles of added ethoxy groups is about 2.6); and tri- or higher-functional polymerizable monomers such as trimethylolpropane tri(meth)acrylate, trimethylolethane tri(meth)acrylate, trimethylolmethane tri(meth)acrylate, pentaerythritol tri(meth)acrylate, pentaerythritol tetra(meth)acrylate, and dipentaerythritol penta(meth)acrylate.

The resin composition for optical shaping of the present invention may comprise other polymerizable compounds than the α,β-unsaturated double bond group-containing compound (A), the (meth)acrylic acid ester compound (B), and the urethanized (meth)acrylic compound (D). Polymerizable compounds may consist essentially of the α,β-unsaturated double bond group-containing compound (A) and the (meth)acrylic acid ester compound (B), or essentially of the α,β-unsaturated double bond group-containing compound (A), the (meth)acrylic acid ester compound (B), and the urethanized (meth)acrylic compound (D). Here, essentially consisting of the α,β-unsaturated double bond group-containing compound (A), the (meth)acrylic acid ester compound (B), and the urethanized (meth)acrylic compound (D) means that the content of other polymerizable compounds than the α,β-unsaturated double bond group-containing compound (A), the (meth)acrylic acid ester compound (B), and the urethanized (meth)acrylic compound (D) is less than 10.0 mass %, preferably less than 5.0 mass %, more preferably less than 1.0 mass %, even more preferably less than 0.1 mass %, particularly preferably less than 0.01 mass % relative to the total amount of the polymerizable compounds comprised in the resin composition for optical shaping.

The resin composition for optical shaping of the present invention is not particularly limited, as long as it comprises the α,β-unsaturated double bond group-containing compound (A), the (meth)acrylic acid ester compound (B), and the photopolymerization initiator (C). The resin composition for optical shaping of the present invention may comprise components (for example, the urethanized (meth)acrylic compound (D) and the polyfunctional polymerizable monomer (E) having a molecular weight of 500 or less) other than the α,β-unsaturated double bond group-containing compound (A), the (meth)acrylic acid ester compound (B), and the photopolymerization initiator (C). The resin composition for optical shaping of the present invention can be produced according to a known method.

The resin composition for optical shaping of the present invention can comprise a polymerization accelerator to improve photocurability as long as there is no departure from the gist of the present invention. Examples of the polymerization accelerator include ethyl 4-(N,N-dimethylamino)benzoate, methyl 4-(N,N-dimethylamino)benzoate, n-butoxyethyl 4-(N,N-dimethylamino)benzoate, 2-((meth)acryloyloxy)ethyl 4-(N,N-dimethylamino)benzoate, 4-(N,N-dimethylamino)benzophenone, and butyl 4-(N,N-dimethylamino)benzoate. In view of imparting desirable curability to the resin composition for optical shaping, preferred is at least one selected from the group consisting of ethyl 4-(N,N-dimethylamino)benzoate, n-butoxyethyl 4-(N,N-dimethylamino)benzoate, and 4-(N,N-dimethylamino)benzophenone.

The resin composition for optical shaping of the present invention may further comprise a filler to adjust paste properties or to alter the surface properties or strength of a cured product of the resin composition for optical shaping. Examples of the filler include organic fillers, inorganic fillers, and organic-inorganic composite fillers. The filler may be used alone, or two or more thereof may be used in combination.

Examples of the material of the organic filler include polymethyl methacrylate, polyethyl methacrylate, methyl methacrylate-ethyl methacrylate copolymer, crosslinked polymethyl methacrylate, crosslinked polyethyl methacrylate, polyesters, polyamides, polycarbonates, polyphenylene ethers, polyoxymethylene, polyvinyl chloride, polystyrene, polyethylene, polypropylene, chloroprene rubber, nitrile rubber, ethylene-vinyl acetate copolymer, styrene-butadiene copolymer, acrylonitrile-styrene copolymer, and acrylonitrile-styrene-butadiene copolymer. One of these may be used alone, or two or more thereof may be used in combination. The shape of the organic filler is not limited to a particular one, and the particle diameter of the filler can be selected as appropriate. In view of ease of handling, mechanical strength, and other properties of the resulting resin composition for optical shaping, the average particle diameter of the organic filler is preferably 0.001 to 50 µm, more preferably 0.001 to 10 µm, even more preferably 0.001 to 1.0 µm.

Examples of the material of the inorganic filler include quartz, silica, alumina, silica-titania, silica-titania-barium oxide, silica-zirconia, silica-alumina, lanthanum glass, borosilicate glass, soda glass, barium glass, strontium glass, glass-ceramic, aluminosilicate glass, barium boroaluminosilicate glass, strontium boroaluminosilicate glass, fluoroaluminosilicate glass, calcium fluoroaluminosilicate glass, strontium fluoroaluminosilicate glass, barium fluoroaluminosilicate glass, and strontium calcium fluoroaluminosilicate glass. One of these may be used alone, or two or more thereof may be used in combination. The shape of the inorganic filler is not limited to a particular one, and an irregularly-shaped filler or a spherical filler can be selected as appropriate. In view of ease of handling, mechanical strength, and other properties of the resulting resin composition for optical shaping, the average particle diameter of the inorganic filler is preferably 0.001 to 50 µm, more preferably 0.001 to 10 µm, even more preferably 0.001 to 1.0 µm.

In order to adjust the flowability of the resin composition for optical shaping, the inorganic filler may be used after an optional surface treatment with a known surface treatment agent such as a silane coupling agent. Examples of the surface treatment agent include vinyltrimethoxysilane, vinyltriethoxysilane, vinyltrichlorosilane, vinyltri(β-methoxyethoxy)silane, γ-methacryloyloxypropyltrimethoxysilane, 8-methacryloyloxyoctyltrimethoxysilane, 11-methacryloyloxyundecyltrimethoxysilane, γ-glycidoxypropyltrimethoxysilane, γ-mercaptopropyltrimethoxysilane, and γ-aminopropyltriethoxysilane.

The organic-inorganic composite filler used in the present invention is a filler prepared by pulverizing a product of polymerization of a paste-like material prepared by adding a monomer component to the above inorganic filler. As the organic-inorganic composite filler, for example, a TMPT filler (a polymerized and pulverized mixture of trimethylolpropanetrimethacrylate and a silica filler) can be used. The shape of the organic-inorganic composite filler is not limited to a particular one, and the particle diameter of the filler can be selected as appropriate. In view of ease of handling, mechanical strength, and other properties of the resulting resin composition for optical shaping, the average particle diameter of the organic-inorganic filler is preferably 0.001 to 50 µm, more preferably 0.001 to 10 µm, even more preferably 0.001 to 1.0 µm.

In the present specification, the average particle diameter of the filler is an average primary particle diameter, and can be determined by a laser diffraction scattering method or by electron microscope observation of the particles. Specifically, the laser diffraction scattering method is convenient for particle diameter measurement on particles with a diameter of 0.1 μm or more, and electron microscope observation is convenient for particle diameter measurement on ultrafine particles with a diameter of less than 0.1 μm. The particle diameter of 0.1 μm is a value determined by the laser diffraction scattering method.

To be specific about the laser diffraction scattering method, for example, the average particle diameter can be measured using a 0.2% aqueous solution of sodium hexametaphosphate as a dispersion medium by means of a laser diffraction particle size distribution analyzer (SALD-2300 manufactured by Shimadzu Corporation).

As a specific example of electron microscopy, particles may be photographed with an electron microscope (Model S-4000, manufactured by Hitachi, Ltd.), and the diameters of particles (at least 200 particles) observed in a unit field of the micrograph may be measured using image-analyzing particle-size-distribution measurement software (Macview, manufactured by Mountech Co., Ltd.). Here, the particle diameters are each determined as an arithmetic mean value of the maximum and minimum lengths of each particle, and the average primary particle diameter is calculated from the number of particles and their particle diameters.

A polymer can be added to the resin composition for optical shaping of the present invention to alter properties such as flexibility and flowability as long as there is no departure from the gist of the present invention. Examples of the polymer that can be added to the present invention include natural rubber, synthetic polyisoprene rubber, liquid polyisoprene rubber, a hydrogenated product thereof, polybutadiene rubber, liquid polybutadiene rubber, a hydrogenated product thereof, styrene-butadiene rubber, chloroprene rubber, ethylene-propylene rubber, acryl rubber, isoprene-isobutylene rubber, acrylonitrile-butadiene rubber, and styrene elastomers. Specific examples of other polymers that can be added to the present invention include a polystyrene-polyisoprene-polystyrene block copolymer, a polystyrene-polybutadiene-polystyrene block copolymer, a poly(α-methylstyrene)-polybutadiene-poly(α-methylstyrene) block copolymer, a poly(p-methylstyrene)-polybutadiene-poly(p-methylstyrene) block copolymer, and hydrogenated products of these. One of these polymers may be used alone, or two or more thereof may be used in combination.

The resin composition for optical shaping of the present invention may optionally comprise a softener. Examples of the softener include petroleum-based softeners such as paraffinic, naphthenic, and aromatic process oils, and vegetable oil-based softeners such as paraffin, peanut oil, and rosin. One of these softeners may be used alone, or two or more thereof may be used in combination. The softener content is not particularly limited as long as there is no departure from the gist of the present invention. Typically, the softener content is at most 200 parts by mass, preferably at most 100 parts by mass relative to total 100 parts by mass of the α,β-unsaturated double bond group-containing compound (A), the (meth)acrylic acid ester compound (B), and the urethanized (meth)acrylic compound (D).

The resin composition for optical shaping of the present invention can comprise a chemical polymerization initiator to improve curability as long as there is no departure from the gist of the present invention. Preferred as the chemical polymerization initiator are organic peroxides and azo compounds. The organic peroxides and azo compounds used as the chemical polymerization initiator are not particularly limited, and known compounds can be used. Typical examples of organic peroxides include ketone peroxide, hydroperoxides, diacyl peroxides, dialkyl peroxides, peroxyketals, peroxyesters, and peroxydicarbonates. One of these chemical polymerization initiators may be used alone, or two or more thereof may be used in combination.

The resin composition for optical shaping of the present invention can comprise a known stabilizer, in order to inhibit deterioration, or to adjust photocurability. Examples of the stabilizer include a polymerization inhibitor, an ultraviolet absorber, and an antioxidant. One of these stabilizers may be used alone, or two or more thereof may be used in combination.

Examples of the polymerization inhibitor include hydroquinone, hydroquinone monomethyl ether, dibutylhydroquinone, dibutylhydroquinone monomethyl ether, 4-t-butyl catechol, 2-t-butyl-4,6-dimethylphenol, 2,6-di-t-butylphenol, and 3,5-di-t-butyl-4-hydroxytoluene. The content of the polymerization inhibitor is preferably 0.001 to 5.0 parts by mass relative to total 100 parts by mass of the α,β-unsaturated double bond group-containing compound (A), the (meth)acrylic acid ester compound (B), and the urethanized (meth)acrylic compound (D).

The resin composition for optical shaping of the present invention can comprise a known additive, in order to adjust shades or paste properties. Examples of the additive include pigments, dyes, organic solvents, and thickeners. One of these additives may be used alone, or two or more thereof may be used in combination.

In a suitable embodiment (X-1) of the resin composition for optical shaping of the present invention, a resin composition for optical shaping comprises the α,β-unsaturated double bond group-containing compound (A), the (meth)acrylic acid ester compound (B), and the photopolymerization initiator (C) and optionally further comprises the urethanized (meth)acrylic compound (D) and/or the polyfunctional polymerizable monomer (E) having a molecular weight of 500 or less, the α,β-unsaturated double bond group-containing compound (A) comprising the N-vinyl group-containing compound (A)-1 having the ring structure (a), the (meth)acrylic acid ester compound (B) comprising the monofunctional (meth)acrylic acid ester compound (B)-1 whose homopolymer has a glass transition temperature is 40° C. or less. In another suitable embodiment (X-2), a resin composition for optical shaping comprises the α,β-unsaturated double bond group-containing compound (A), the (meth)acrylic acid ester compound (B), and the photopolymerization initiator (C) and optionally further comprises the urethanized (meth)acrylic compound (D) and/or the polyfunctional polymerizable monomer (E) having a molecular weight of 500 or less, the α,β-unsaturated double bond group-containing compound (A) comprising the N-vinyl group-containing compound (A)-1 having the ring structure (a) and the (meth)acrylic acid ester (A)-2 having the ring structure (a), the (meth)acrylic acid ester compound (B) comprising the monofunctional (meth)acrylic acid ester compound (B)-1 whose homopolymer has a glass transition temperature is 40° C. or less. In another suitable embodiment (X-3), a resin composition for optical shaping comprises the α,β-unsaturated double bond group-containing compound (A), the (meth)acrylic acid ester compound (B), and the photopolymerization initiator (C) and optionally further comprises the urethanized (meth)acrylic compound (D) and/or the polyfunctional polymerizable monomer (E) having a molecular weight of 500 or less, the α,β-unsaturated double bond group-containing compound (A) comprising the N-vinyl group-containing compound (A)-1 having the ring structure (a) and the (meth)acrylic acid ester (A)-2 having the ring structure (a), the (meth)acrylic acid ester compound (B) comprising the monofunctional (meth)acrylic acid ester compound (B)-1 whose homopolymer has a glass transition temperature is 40° C. or less and the (meth)acrylic acid ester compound (B)-2. For any of the above embodiments (X-1) to (X-3), adjustment of the amounts of the components, and addition or omission of some of the components can be done on the basis of the above description. For any of the above embodiments, the composition and values of properties (such as flexural modulus, flexural strength, and the rate of decrease of flexural strength) of each resin composition for optical shaping can be adjusted and combined appropriately.

The resin composition for optical shaping of the present invention enables easy fabrication of an object by virtue of its low viscosity and can be made into a cured product having desirable toughness and water resistance when used for stereolithographic fabrication (for example, by vat stereolithography, particularly by bottom-up vat stereolithography). The resin composition for optical shaping of the present invention can also be used for stereolithographic fabrication by an inkjet method. Therefore, the resin composition for optical shaping of the present invention and a cured product thereof can be used in applications where such advantages can be exploited (for example, intraoral use), can be used as dental materials and medical materials, and are particularly optimal for dental treatment using, for example, dental occlusal splints (also called "dental mouthpieces") and denture base materials. Dental occlusal splints are, for example, oral appliances (OAs) and night guards. Particularly optimal medical materials are appliances for treatment of sleep apnea. Aside from such dental treatment applications using dental mouthpieces and denture base materials, the resin composition for optical shaping of the present invention is also suitable for mouthguards used for protection against external forces in sport activities. Preferably, the resin composition for optical shaping of the present invention is used as a resin composition for bottom-up vat stereolithography because, in that case, the benefits such as desirable toughness, water resistance, and fabricability can be more likely to be exhibited. The shape of a cured product of the resin composition for optical shaping of the present invention can vary according to the intended use. In the resin composition for optical shaping of the present invention, the type and content of each component (the α,β-unsaturated double bond group-containing compound (A), the (meth)acrylic acid ester compound (B), the photopolymerization initiator (C), the urethanized (meth)acrylic compound (D), and additional components (the polyfunctional polymerizable monomer (E) having a molecular weight of 500 or less, the polymerization accelerator, the filler, the polymer, the softener, the stabilizer, the additive, etc.)) can be optionally adjusted according to the intended use (for example, a dental occlusal splint or a denture base material).

The resin composition for optical shaping of the present invention can be used in a wide variety of applications by taking advantage of its properties, specifically, a low volume shrinkage rate and superior fabrication accuracy exhibited upon curing with light, the ability to be made into cured products such as a shaped product or three-dimensional object having desirable toughness and water resistance. For example, the resin composition for optical shaping of the present invention can be used for stereolithographical production of a three-dimensional object, production of various shaped products such as a film-shaped object and a molding produced, for example, by flow casting or casting, and a die for coating or vacuum molding.

The resin composition for optical shaping of the present invention is particularly suited for stereolithography. In stereolithography applications, the resin composition for optical shaping of the present invention enables smooth production of a three-dimensional object having desirable toughness and water resistance with superior fabrication accuracy while ensuring a low volume shrinkage rate upon curing with light.

Another embodiment of the present invention is a method for stereolithographically producing a three-dimensional object using any of the above resin compositions for optical shaping.

In stereolithography using the resin composition for optical shaping of the present invention, any known bottom-up stereolithography method and device (for example, a stereolithography device such as the DigitalWax (registered trademark) 020D manufactured by DWS) can be employed. In the present invention, the light energy used to cure the resin is preferably an active energy beam. The term "active energy beam" means an energy ray capable of curing a resin composition for optical shaping, and includes, for example, ultraviolet light, an electron beam, X-rays, radiant rays, and high-frequency waves. For example, the active energy beam may be ultraviolet light of 300 to 420 nm wavelengths. The light source of the active energy beam may be, for example, a laser such as an Ar laser or a He—Cd laser; or a lighting such as a halogen lamp, a xenon lamp, a metal halide lamp, an LED, a mercury lamp, and a fluorescent lamp. Lasers are particularly preferred. When the light source is a laser, the fabrication time can be reduced by increasing the energy level, and a three-dimensional object can be produced with superior fabrication accuracy by taking advantage of the desirable convergence of a laser beam.

Stereolithography using the resin composition for optical shaping of the present invention can employ any known method and any known stereolithography system, and the method and device are not particularly limited, as noted above. A typical example of a stereolithography method preferred for use in the present invention is a method for obtaining a desired three-dimensional object through a repeated procedure that includes a step of forming a cured layer by selectively applying the active energy beam to the resin composition for optical shaping to obtain a cured layer having a desired pattern, and a step of continuously forming another cured layer by similarly applying the active energy beam to a newly supplied, uncured liquid resin composition for optical shaping. The resulting three-dimensional object may be used as it is, or may be used after its mechanical strength, shape stability, or other properties is improved by, for example, post-curing by light irradiation or heat.

A cured product of the resin composition for optical shaping of the present invention has a flexural modulus in a range of preferably 0.3 to 3.0 GPa, more preferably 0.5 to 2.5 GPa, even more preferably 0.8 to 2.0 GPa. With a flexural modulus of 2.0 GPa or less, a cured product of the resin composition for optical shaping of the present invention can have softness, which allows the cured product serving as a splint to more easily conform to the teeth and makes it more comfortable to wear the splint. Such a splint is also less likely to come off due to, for example, sleep bruxism at night. A cured product of the resin composition for optical shaping of the present invention has a flexural strength of preferably 30 MPa or more, more preferably 40 MPa or more, even more preferably 50 MPa or more.

The particular structure, shape, size, etc. of a three-dimensional object obtained by stereolithography is not particularly limited and can be decided according to use. Typical examples of application areas to which the stereolithography of the present invention is applicable include production of, for example, models for assessing exterior design in a designing process, models for checking functions of components and parts, resin patterns for making molds, base models for making dies, and direct molds for prototype dies. More specifically, the stereolithography of the present invention is applicable to, for example, production of models or work models for precision components and parts, electrical and electronic components, furniture, architectural structures, automobile parts, various containers and vessels, castings, dies, and base molds.

EXAMPLES

The following describes the present invention in greater detail by way of Examples. It should be noted, however, that the present invention is in no way limited by the following Examples, and various changes may be made by a person with ordinary skill in the art within the technical idea of the present invention.

Components used for resin compositions for optical shaping of Examples and Comparative Examples are listed below with the abbreviations.

[α,β-Unsaturated Double Bond Group-Containing Compound (A)]
NVCZ: N-vinylcarbazole (manufactured by Tokyo Chemical Industry Co., Ltd.)
NVCP: N-vinyl-ε-caprolactam (manufactured by Tokyo Chemical Industry Co., Ltd.)
PMPA: pentamethyl piperidinyl acrylate (manufactured by Hitachi Chemical Company, Ltd.)
PMPMA: pentamethyl piperidinyl methacrylate (manufactured by Tokyo Chemical Industry Co., Ltd.)
[(Meth)Acrylic Acid Ester Compound (B)]
[(Meth)Acrylic Acid Ester Compound (B)-1]
EPPA: ethoxylated-o-phenylphenol acrylate (manufactured by SHIN-NAKAMURA CHEMICAL Co., Ltd.) (boiling point converted into boiling point at normal pressure: 300° C. or more; Tg of homopolymer=30° C.)
POBA: m-phenoxybenzyl methacrylate (manufactured by Kyoeisha Chemical Co., Ltd.) (boiling point converted into boiling point at normal pressure: 300° C. or more; Tg of homopolymer=−35° C.)
[(Meth)Acrylic Acid Ester Compound (B)-2]
AMA: 9-anthrylmethyl methacrylate (manufactured by Tokyo Chemical Industry Co., Ltd.) (solids; boiling point converted into boiling point at normal pressure: 300° C. or more; Tg of homopolymer>40° C.)
[(Meth)Acrylic Acid Ester Compound (B')]
DCPA: dicyclopentanyl acrylate (manufactured by Hitachi Chemical Company, Ltd.) (boiling point converted into boiling point at normal pressure: 260° C.)
ATHFA: (5-ethyl-1,3-dioxane-5-yl)methyl acrylate (manufactured by Sartomer) (boiling point converted into boiling point at normal pressure: 277° C.)
[Photopolymerization Initiator (C)]
TPO: 2,4,6-trimethylbenzoyl diphenylphosphine oxide
BAPO: bis(2,4,6-trimethylbenzoyl)phenylphosphine oxide
[Urethanized (Meth)Acrylic Compound (D)]
Urethanized (meth)acrylic compounds (D-1) and (D-2) produced in Synthesis Examples 1 and 2 below were used.

[Polyfunctional Polymerizable Monomer (E) Having a Molecular Weight of 500 or Less]
NPGDA: neopentyl glycol diacrylate (manufactured by SHIN-NAKAMURA CHEMICAL Co., Ltd.) (boiling point converted into boiling point at normal pressure: 300° C. or more)
[Polymerization Inhibitor]
BHT: 3,5-di-t-butyl-4-hydroxytoluene <Synthesis Example 1>[Production of Urethanized (Meth)Acrylic Compound (D-1)]

(1) First, 250 g of isophorone diisocyanate and 0.15 g of di-n-butyltin dilaurate were added into a 5 L four-neck flask equipped with a stirrer, a thermostat, a thermometer, and a condenser, and the mixture was heated to 70° C. while being stirred.
(2) Separately, 2,500 g of a polyester polyol (Kuraray Polyol (registered trademark) P-2030 manufactured by Kuraray Co., Ltd.; a polyol formed of isophthalic acid and 3-methyl-1,5-pentanediol; a weight-average molecular weight Mw of 2,000) was added into a dropping funnel equipped with a side tube, and the solution in the dropping funnel was dropped into the flask of (1). Here, the solution was dropped at a constant rate over a time period of 4 hours with the temperature inside the flask maintained at 65 to 75° C. while the solution in the flask of (1) was being stirred. After dropping, the mixture was stirred at a temperature in the range for 2 hours to allow for reaction.
(3) Thereafter, a homogenous solution prepared by adding 150 g of 2-hydroxyethyl acrylate and 0.4 g of hydroquinone monomethyl ether into a different dropping funnel was dropped at a constant rate over a time period of 2 hours with the temperature inside the flask maintained at 55 to 65° C. Then, a reaction was allowed for 4 hours with the temperature of the solution in the flask maintained at 70 to 80° C. to obtain a urethanized (meth)acrylic compound (D-1). According to GPC analysis, the weight-average molecular weight Mw of the urethanized (meth)acrylic compound (D-1) was 2,700.

<Synthesis Example 2>[Production of Urethanized (Meth)Acrylic Compound (D-2)]

(1) First, 250 g of isophorone diisocyanate and 0.15 g of di-n-butyltin dilaurate were added into a 5 L four-neck flask equipped with a stirrer, a thermostat, a thermometer, and a condenser, and the mixture was heated to 70° C. while being stirred.
(2) Separately, 2,500 g of a polyester polyol (Kuraray Polyol (registered trademark) P-2050 manufactured by Kuraray Co., Ltd.; a polyol of sebacic acid and 3-methyl-1,5-pentanediol; a weight-average molecular weight Mw of 2,000) was added into a dropping funnel equipped with a side tube, and the solution in the dropping funnel was dropped into the flask of (1). Here, the solution was dropped at a constant rate over a time period of 4 hours with the temperature inside the flask maintained at 65 to 75° C. while the solution in the flask of (1) was being stirred. After dropping, the mixture was stirred at a temperature in the range for 2 hours to allow for reaction.
(3) Thereafter, a homogenous solution prepared by adding 150 g of 2-hydroxyethyl acrylate and 0.4 g of hydroquinone monomethyl ether into a different dropping funnel was dropped at a constant rate over a time period of 2 hours with the temperature inside the flask maintained at 55 to 65° C. Then, a reaction was allowed for 4 hours with the temperature of the solution in the flask maintained at 70 to 80° C. to obtain a urethanized (meth)acrylic compound (D-2). According to GPC analysis, the weight-average molecular weight Mw of the urethanized (meth)acrylic compound (D-2) was 2,600.

Examples 1 to 9 and Comparative Examples 1 to 5

The components were mixed under ordinary temperature (20° C.±15° C., Japanese Industrial Standards (JIS) Z 8703: 1983) in the amounts shown in Tables 1 and 2 to prepare pastes as resin compositions for optical shaping according to Examples 1 to 9 and Comparative Examples 1 to 5.
<Fabricability>
The resin compositions for optical shaping of Examples and Comparative Examples were each fabricated into a specimen measuring 3.3 mm in thickness, 10.0 mm in width, and 64 mm in length (n=5), using a stereolithography device (DigitalWax (registered trademark) 020D, manufactured by DWS). The resin composition was rated as "Satisfactory" when it was fabricable into a sheet of the desired dimensions in all five specimens, and "Unsatisfactory" when the resin composition was not fabricable into the desired three-dimensional object in any of the five specimens. The following evaluations were conducted using specimens fabricated as above.
<Toughness (Flexural Modulus, Flexural Strength, Displacement at Fracture Point)>
Specimens (64.0 mm in length, 10.0 mm in width, 3.3 mm in thickness) as used for the evaluation of fabricability and having dimensions as described in JIS T 6501: 2012 (Acrylic Resin for Denture Base) were produced and subjected to a flexural strength test to evaluate cured products of the resin compositions for optical shaping of Examples and Comparative Examples. The flexural strength test was conducted in accordance with JIS T 6501: 2012 using a universal testing machine (Autograph AG-I 100 kN, manufactured by Shimadzu Corporation) at a crosshead speed of 5 mm/min (n=5). The flexural strength and flexural modulus of the cured product were found by calculating means from values measured for each specimen. The preferred range of the flexural modulus of the specimens is 0.3 to 3.0 GPa, more preferably 0.5 to 2.5 GPa, even more preferably 0.8 to 2.0 GPa. The preferred range of the flexural strength of the specimens is 30 MPa or more, more preferably 40 MPa or more, even more preferably 50 MPa or more. As for the displacement at a fracture point, it is preferred that the specimens do not fracture. The flexibility of a specimen was rated as "Satisfactory" when the specimen did not fracture in the test or when the specimen fractured at a displacement of 20 mm or more. The flexibility of a specimen was rated as "Acceptable" when the specimen fractured at a displacement of more than 10 mm and less than 20 mm, and "Unsatisfactory" when the specimen fractured at a displacement of 10 mm or less.
<Water Resistance>
A cured product of the resin composition of each Examples and Comparative Example was immersed in 37° C. water for 24 hours, and measured for flexural strength in the same manner as in the flexural strength test above (n=5). The result of the measurement of the flexural strength as toughness was defined as the initial flexural strength. The water resistance is desirable when the rate of change (rate of decrease) of flexural strength was 10% or less, the rate being determined in terms of the flexural strength after 24-hour immersion in 37° C. water and the initial flexural strength. The water resistance was more desirable when the rate of change (rate of decrease) of flexural strength was 7% or less.

Rate of change (rate of decrease) of flexural strength (%)=[{initial flexural strength (MPa)−flexural strength (MPa) after 24-hour immersion in 37° C. water}/initial flexural strength (MPa)]×100

<Odor>
The resin composition for optical shaping of each Example and Comparative Example was evaluated for odor by a group of 10 panelists (n=1). The resin composition was rated as "Satisfactory" when one or fewer panelists smelled an unpleasant odor, "Acceptable" when 2 to 4 panelists smelled an unpleasant odor, and "Unsatisfactory" when 5 or more panelists smelled an unpleasant odor. The resin compositions are of satisfactory quality when there is no perceivable unpleasant odor.

TABLE 1

| | | | Examples | | | | | | | | |
|---|---|---|---|---|---|---|---|---|---|---|---|
| | | | 1 | 2 | 3 | 4 | 5 | 6 | 7 | 8 | 9 |
| Components (parts by mass) | (A) | NVCZ | 20 | 30 | 5 | | 20 | 20 | 20 | 20 | |
| | | NVCP | | | | 20 | | | | | |
| | | PMPA | 5 | 10 | 5 | 5 | | 5 | 5 | | 25 |
| | | PMPMA | | | | | 5 | | | | |
| | (B) | EPPA | 35 | 30 | 40 | 35 | 35 | 20 | 25 | 40 | 35 |
| | | POBA | | | | | | 20 | | | |
| | | AMA | | | | | | | 10 | | |
| | (C) | TPO | 3.0 | 3.0 | 3.0 | 3.0 | 3.0 | 3.0 | 3.0 | 3.0 | 3.0 |
| | | BAPO | | | | | 0.5 | | 0.5 | | |
| | (D) | Urethanized (meth)acrylic compound (D-1) | 40 | 30 | 50 | 40 | 40 | 35 | | 40 | 40 |
| | | Urethanized (meth)acrylic compound (D-2) | | | | | | | 40 | | |
| | | BHT | 0.05 | 0.05 | 0.05 | 0.05 | 0.05 | 0.05 | 0.05 | 0.05 | 0.05 |
| Fabricability | | | Satisfactory | Satisfactory | Satisfactory | Satisfactory | Satisfactory | Satisfactory | Satisfactory | Satisfactory | Satisfactory |

TABLE 1-continued

|  |  | Examples | | | | | | | | |
|---|---|---|---|---|---|---|---|---|---|---|
|  |  | 1 | 2 | 3 | 4 | 5 | 6 | 7 | 8 | 9 |
| Toughness | Flexural modulus (GPa) | 1.2 | 1.6 | 1.0 | 0.9 | 1.3 | 1.3 | 0.9 | 0.7 | 0.6 |
|  | Flexural strength (MPa) | 56 | 62 | 54 | 48 | 57 | 55 | 52 | 49 | 48 |
|  | Displacement at fracture point | Satisfactory | Satisfactory | Satisfactory | Satisfactory | Satisfactory | Satisfactory | Satisfactory | Satisfactory | Satisfactory |
| Water resistance | Flexural strength (MPa) | 56 | 61 | 52 | 45 | 56 | 52 | 52 | 46 | 47 |
|  | Rate of decrease (%) | 0 | 1.6 | 3.7 | 6.3 | 1.8 | 5.5 | 0 | 6.1 | 2.1 |
| Odor |  | Satisfactory | Satisfactory | Satisfactory | Satisfactory | Satisfactory | Satisfactory | Satisfactory | Satisfactory | Satisfactory |

TABLE 2

|  |  |  | Comparative Examples | | | | |
|---|---|---|---|---|---|---|---|
|  |  |  | 1 | 2 | 3 | 4 | 5 |
| Components (parts by mass) | (A) | NVCZ |  | 20 | 20 | 20 | 20 |
|  |  | PMPA |  | 40 | 5 | 5 | 5 |
|  | (B) | EPPA | 35 |  |  | 10 |  |
|  | (C) | TPO | 3.0 | 3.0 | 3.0 | 3.0 | 3.0 |
|  | (D) | Urethanized (meth)acrylic compound (D-1) | 65 | 40 | 40 | 40 | 40 |
|  | (B') | DCPA |  |  | 35 |  |  |
|  |  | ATHFA |  |  |  |  | 35 |
|  | (E) | NPGDA |  |  |  | 25 |  |
|  |  | BHT | 0.05 | 0.05 | 0.05 | 0.05 | 0.05 |
|  | Fabricability |  | Satisfactory | Satisfactory | Unsatisfactory | Satisfactory | Satisfactory |
| Toughness | Flexural modulus (GPa) |  | 0.2 | 1.6 | — | 3.2 | 1.3 |
|  | Flexural strength (MPa) |  | 35 | 64 | — | 72 | 44 |
|  | Displacement at fracture point |  | Satisfactory | Unsatisfactory | — | Unsatisfactory | Satisfactory |
| Water resistance | Flexural strength (MPa) |  | 18 | 29 | — | 68 | 12 |
|  | Rate of decrease (%) |  | 49 | 55 | — | 5.6 | 73 |
|  | Odor |  | Satisfactory | Satisfactory | Unsatisfactory | Satisfactory | Acceptable |

As shown in Tables 1 and 2, the resin compositions for optical shaping of Examples 1 to 9 had desirable fabricability and emitted weak odors. Moreover, the cured products of the resin compositions according to Examples 1 to 9 had desirable toughness and water resistance. Specifically, the cured products of the resin compositions for optical shaping according to Examples 1 to 9 had higher toughness and water resistance than those of the cured products of the resin compositions of Comparative Examples 1, 2, 4, and 5 not comprising the α,β-unsaturated double bond group-containing compound (A) or the (meth)acrylic acid ester compound (B) of the present invention. The resin compositions for optical shaping according to Examples 1 to 9 had better fabricability than that of the resin composition according to Comparative Example 3. The resin composition for optical shaping according to Comparative Example 3 comprising a large amount of the polyfunctional polymerizable monomer having a molecular weight of 500 or less had poor fabricability, which resulted in a failure to form a specimen and a failure to measure the properties.

INDUSTRIAL APPLICABILITY

The resin composition for optical shaping of the present invention emits a weaker odor, enables easy fabrication of an object by virtue of its low viscosity, and can be made into a fabricated object having desirable toughness and water resistance when used for stereolithographic fabrication (particularly by vat stereolithography). A cured product of the resin composition for optical shaping of the present invention is therefore suited for dental materials (particularly dental occlusal splints and denture base materials) and medical materials (particularly appliances for treatment of sleep apnea).

The invention claimed is:

1. A resin composition, comprising:
   an α,β-unsaturated double bond group-containing compound (A) having a ring structure (a) containing a nitrogen atom;
   a (meth)acrylic acid ester compound (B) having a boiling point of 280° C. or more at normal pressure, having a carbocyclic group, and having no nitrogen-containing heterocyclic group;

a urethanized (meth)acrylic compound (D);
a photopolymerization initiator (C);
optionally, a polyfunctional polymerizable monomer (E) having a molecular weight of 500 or less and not comprised in the α,β-unsaturated double bond group-containing compound (A) and the (meth)acrylic acid ester compound (B), and
optionally, an other compound different from the α,β-unsaturated double bond group-containing compound (A), the (meth)acrylic acid ester compound (B), the urethanized (meth)acrylic compound (D) and the optional polyfunctional polymerizable monomer (E) wherein
a weight-average molecular weight Mw of the urethanized (meth)acrylic compound (D) is from 2,000 to 5,000,
a content of the urethanized (meth)acrylic compound (D) is 1 to 98 mass % relative to the total amount of the α,β-unsaturated double bond group-containing compound (A), the (meth)acrylic acid ester compound (B) and the urethanized (meth)acrylic compound (D),
if present, a content of the polyfunctional polymerizable monomer (E) having a molecular weight of 500 or less is 20 mass % or less relative to a total amount of polymerizable compounds comprised in the resin composition, and
if present, a content of the polymerizable compound different from the α,β-unsaturated double bond group-containing compound (A), the (meth)acrylic acid ester compound (B), the urethanized (meth)acrylic compound (D) and the optional polyfunctional polymerizable monomer (E) is less than 10.0 mass %, relative to the total amount of the polymerizable compounds comprised in the resin composition.

2. The resin composition according to claim 1, wherein the α,β-unsaturated double bond group-containing compound (A) has the ring structure (a) containing neither an oxygen atom nor a sulfur atom.

3. The resin composition according to claim 1, wherein the α,β-unsaturated double bond group-containing compound (A) comprises an N-vinyl group-containing compound (A)-1 having the ring structure (a).

4. The resin composition according to claim 1, wherein the α,β-unsaturated double bond group-containing compound (A) comprises a (meth)acrylic acid ester (A)-2 having the ring structure (a) and/or a (meth)acrylamide (A)-3 having the ring structure (a).

5. The resin composition according to claim 1, wherein the ring structure (a) containing a nitrogen atom is a piperidine ring.

6. The resin composition according to claim 1, wherein the α,β-unsaturated double bond group-containing compound (A) is monofunctional.

7. The resin composition according to claim 3, wherein the N-vinyl group-containing compound (A)-1 is at least one selected from the group consisting of N-vinylcarbazole, N-vinyl-ε-caprolactam, and N-vinyl-2-pyrrolidone.

8. The resin composition according to claim 1, wherein the (meth)acrylic acid ester compound (B) comprises a monofunctional (meth)acrylic acid ester compound.

9. The resin composition according to claim 1, not comprising the polyfunctional polymerizable monomer (E) having a molecular weight of 500 or less.

10. The resin composition according to claim 1, wherein the (meth)acrylic acid ester compound (B) comprises a monofunctional (meth)acrylic acid ester compound (B)-1 whose homopolymer has a glass transition temperature of 40° C. or less.

11. The resin composition according to claim 1, wherein
the urethanized (meth)acrylic compound (D) is a (meth)acrylate having, per molecule, a urethane bond and at least one structure selected from the group consisting of a polyester, a polycarbonate, a polyurethane, a polyether, a poly(conjugated diene), and a hydrogenated poly(conjugated diene).

12. A dental material comprising a cured product of the resin composition according to claim 1.

13. A dental occlusal splint comprising a cured product of the resin composition according to claim 1.

14. A denture base material comprising a cured product of the resin composition according to claim 1.

15. A medical material comprising a cured product of the resin composition according to claim 1.

16. An appliance for treatment of sleep apnea comprising a cured product of the resin composition according to claim 1.

17. A method, comprising:
stereolithographically producing a three-dimensional object with the resin composition according to claim 1.

18. The resin composition according to claim 1, wherein a content of the urethanized (meth)acrylic compound (D) is from 5 mass % to 90 mass % relative to a total amount of the α,β-unsaturated double bond group-containing compound (A), the (meth)acrylic acid ester compound (B), and the urethanized (meth)acryl compound (D).

* * * * *